United States Patent [19]
Shiozawa

[11] 3,874,217
[45] Apr. 1, 1975

[54] AUTOMATIC SORTING APPARATUS IN PIPE WORKING SYSTEM
[75] Inventor: Kaoru Shiozawa, Chiba, Japan
[73] Assignee: Mitsui Shipbuilding and Engineering Co. Ltd., Tokyo, Japan
[22] Filed: July 25, 1973
[21] Appl. No.: 382,527

[30] Foreign Application Priority Data
Aug. 9, 1972  Japan.............................. 47-80264

[52] U.S. Cl................................. 72/419, 214/11 R
[51] Int. Cl............................................ B21b 43/00
[58] Field of Search ...... 72/DIG. 11, 424, 252, 419; 214/11 R; 198/19

[56] References Cited
UNITED STATES PATENTS
2,573,848  11/1951  Kivchner........................... 214/11 R
2,979,181  4/1961  Abbey................................... 198/19
3,250,369  5/1966  Pianowski............................. 198/19

Primary Examiner—C. W. Lanham
Assistant Examiner—Robert M. Rogers
Attorney, Agent, or Firm—Howson and Howson

[57]  ABSTRACT
Automatic sorting apparatus in a pipe working system comprising a pipe loading means having hooks to receive a pipe to be bent, the receiving operation of the hooks serving also as a sorting operation for pipe bending.

2 Claims, 1 Drawing Figure

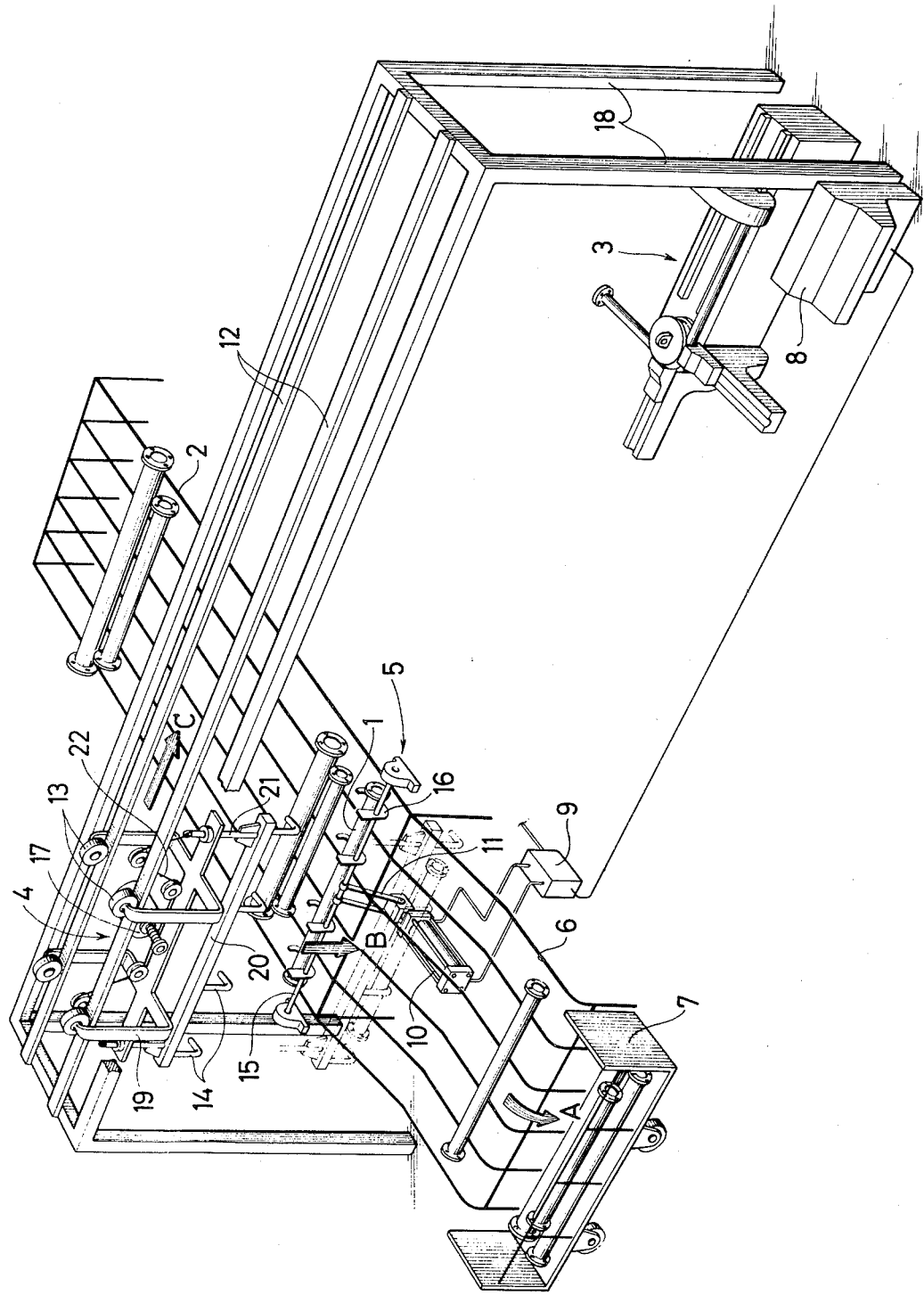

AUTOMATIC SORTING APPARATUS IN PIPE WORKING SYSTEM

The present invention relates to an apparatus for automatically sorting various pipes which are cut to specified lengths in a pipe working system in ship building or the like.

In a pipe working system, pipes are cut continuously to a predetermined length on an automatized line and flanges are welded to each pipe. These pipes must be sorted into finished straight pipes and pipes to be bent. The straight pipes are delivered as finished pipes, and the pipes to be bent are transferred to a pipe bender. This sorting has been manually performed, which was a hindrance to automation of a pipe working system.

The object of the present invention is to provide an apparatus which can perform automatizing of pipe working system.

BRIEF DESCRIPTION OF THE DRAWING

The drawing is a perspective view of the device.

The apparatus according to the present invention is characterized in that pipes are sorted automatically utilizing a pipe feeder, which feed a leading pipe of the aligned pipes on a pipe skid, and a loader means, which feeds the pipes automatically to a pipe bender.

Describing now the present invention with reference to the attached drawing, which shows a perspective view of an example embodying the present invention, a pipe skid 2 mounts a large number of pipes which have been cut and welded with flanges. The pipe skid and the discharging portion 6 of the pipe skid 2 are downwardly inclined so that pipes can roll down by their own weight. At the boundary between the skid 2 and 6, a pipe feeding means 5 is provided. The pipe feeding means 5 is provided with hooks 16 which are fixed on a rotatable shaft 15 having an arm 11 connected to a hydraulic cylinder mechanism 10. The hydraulic cylinder mechanism 10 is operated by a pressurized liquid supplied from a liquid source through an electromagnetic valve 9 to rotate the shaft 15 receprocatingly. A pipe bender 3 is provided in a direction perpendicular to the pipe skid 2. Over and across the skid 2 and the bender 3 two beams 12 are supported by supporting frames 18. A loader means 4 is suspended from the beams 12 by wheels 13, and being movable by an electric motor not shown in the drawing. A horizontal beam 20 is provided below the frame 19 of the loader means 4 in a longitudinal direction, and a pair of vertical shafts 21 connected to the horizontal beam 20 are passed slidably through the frame 19. An end of a rope 22 is connected to the top of each vertical shaft 21, and passing through sheaves and can be wound up and down by means of an electric motor 17. A number of hooks 14 are provided under the horizontal beam 20, and pipes are taken up by these hooks and transported. An operating board 8 is provided beside the pipe bender 13, from which wiring is provided to said electromagnetic valve 9 and the motor of the loader means 4 to control them.

The pipes, cut to a predetermined length and welded with a flange, are delivered onto the skid 2, and accumulated orderly side by side by hooks 16 of the feeding means 5. When the hydraulic cylinder mechanism 10 is acutated to perform one reciprocating mortion by actuating the valve 9, so that hooks 16 are rocked first counterclockwise and then clockwise. Each rocking of hooks feeds only one pipe 1 from the skid 2. If the delivered pipe need not be subjected to a bending work, it rolls in a direction shown by an arrow A on the discharging portion 6 of skid directly, and is dropped on a carrier 7. If the pipe requires to be subjected to a bending work, the beam 20 of the loader 4 is lowered as shown by arrow B and dotted line and the pipe fed by the feeding means 5 is received by hooks 14 of the loader 4. Then, the beam 20 is lifted and the loader 4 is moved in the direction shown by the arrow C. Thus, the pipe to be worked is conveyed to the pipe bender 3.

A series of these operations are effected automatically by commands issued from the operating board 8. Whether the bending work is to be effected or not is selected by operation of a push button by operators, or by sequence control effected by command of a card, which has been provided with predetermined order or sequence.

According to the present invention, as described above, the pipe feeding means and the loader means are used in combination, and the finished straight pipes and the pipes to be bent are sorted automatically without resorting to a human hand.

What is claimed is:

1. A pipe working system comprising pipe conveyor means for supplying a series of pipes some of which are to be bent and some of which are not, carrier means at the output end of said conveyor means for receiving said pipes which are not to be bent, pipe feeding means adjacent said conveyor means for receiving said pipes from the input end of said conveyor means and for controlledly releasing them one at a time toward said output end of said conveyor means, pipe bender means, overhead beam means extending from above said conveyor means to above said bender means, pipe loader means suspended from and controlledly movable along said beam means, said pipe loader means comprising downwardly extending hook means and means for controlledly lowering and raising said hook means to intercept, raise, and deliver to said bender means only those of said pipes released by said pipe feeding means which are to be bent.

2. The system of claim 1, in which said conveyor means comprises pipe skid means including a plurality of spaced-apart pipe-supporting members and said hook means are adapted to be raised and lowered through the spaces between said pipe-supporting members.

* * * * *